(No Model.)
6 Sheets—Sheet 1.

G. W. DICKIE.
VALVE GEAR FOR HYDRAULIC PUMPS.

No. 295,622. Patented Mar. 25, 1884.

Witnesses,
Geo. H. Strong.
J. A. Frwins

Inventor
Geo. W. Dickie.
By Dewey & Co.
Attorneys (No Model.)  6 Sheets—Sheet 2.

G. W. DICKIE.
VALVE GEAR FOR HYDRAULIC PUMPS.

No. 295,622.  Patented Mar. 25, 1884.

Witnesses:
Geo. H. Strong.

Inventor,
Geo. W. Dickie
Dewey & Co.
Attorneys (No Model.) 6 Sheets—Sheet 3.

G. W. DICKIE.
VALVE GEAR FOR HYDRAULIC PUMPS.

No. 295,622. Patented Mar. 25, 1884.

Witnesses  
Geo. H. Strong

Inventor,  
Geo. W. Dickie  
By Dewey & Co.  
Attorneys (No Model.)

6 Sheets—Sheet 4.

G. W. DICKIE.
VALVE GEAR FOR HYDRAULIC PUMPS.

No. 295,622.

Patented Mar. 25, 1884.

Witnesses,
Geo. H. Strong.
J. H. Krouse

Inventor,
Geo. W. Dickie
By
Dewey & Co.
Attorneys (No Model.) 6 Sheets—Sheet 5.

G. W. DICKIE.
VALVE GEAR FOR HYDRAULIC PUMPS.

No. 295,622. Patented Mar. 25, 1884.

Witnesses:
Geo. H. Strong.

Inventor,
Geo. W. Dickie
By Dewey & Co.
Attorneys (No Model.) 6 Sheets—Sheet 6.

G. W. DICKIE.
VALVE GEAR FOR HYDRAULIC PUMPS.

No. 295,622. Patented Mar. 25, 1884.

Witnesses,
Geo. H. Strong
J. A. House

Inventor
Geo. W. Dickie
By Dewey & Co.
Attorneys

UNITED STATES PATENT OFFICE.

GEORGE W. DICKIE, OF SAN FRANCISCO, CALIFORNIA.

VALVE-GEAR FOR HYDRAULIC PUMPS.

SPECIFICATION forming part of Letters Patent No. 295,622, dated March 25, 1884.

Application filed March 21, 1882. (No model.)

*To all whom it may concern:*

Be it known that I, GEORGE W. DICKIE, of San Francisco, county of San Francisco, State of California, have invented an Improved Valve-Gear for Hydraulic Pumps; and I hereby declare the following to be a full, clear, and exact description thereof.

My invention relates to certain improvements in the method of operating the valve-gear of pumping apparatus, and it is more especially applicable to that class known as "hydraulic pumps," which are operated by a column of water under a high head or great pressure.

My invention consists, principally, in a means for operating the main valves of the pumps by a system of auxiliary valves, these latter being moved by means of a time-cylinder, which is actuated by the movement of the pump, so as to move the auxiliary valves successively.

Figure 1:
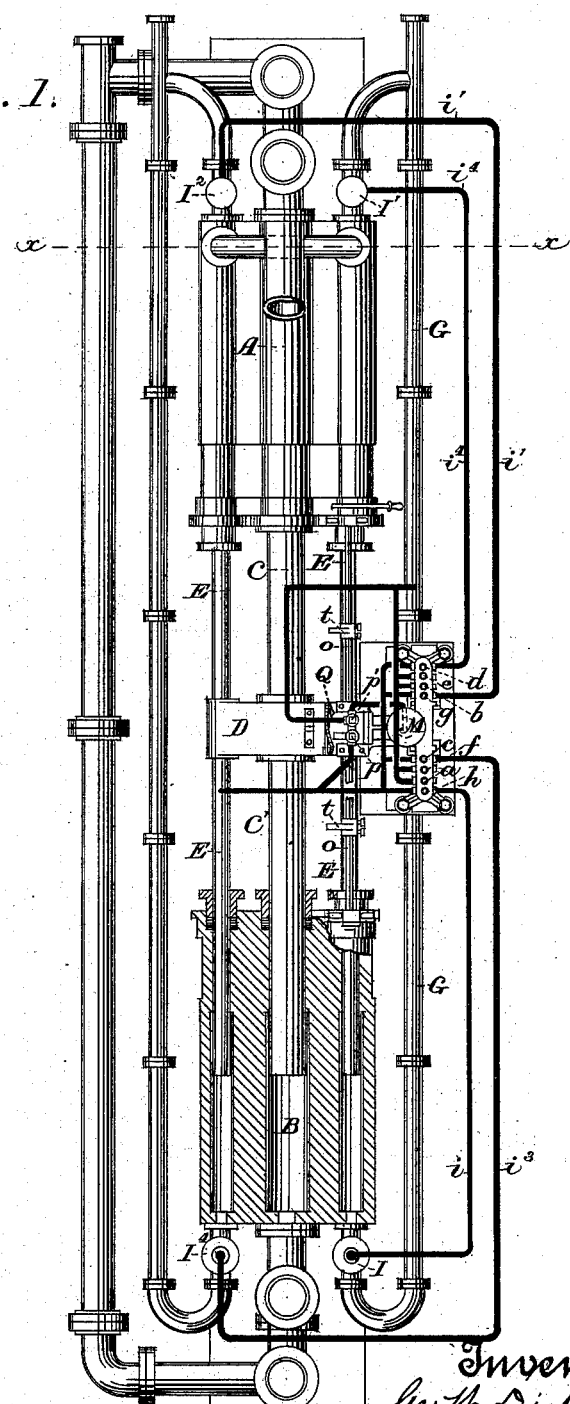
Figure 2:
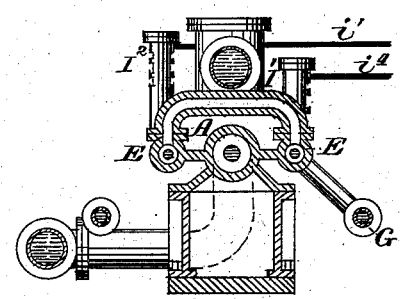
Figure 3:
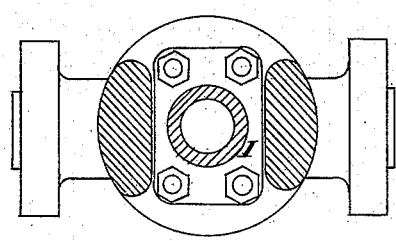
Figure 4:
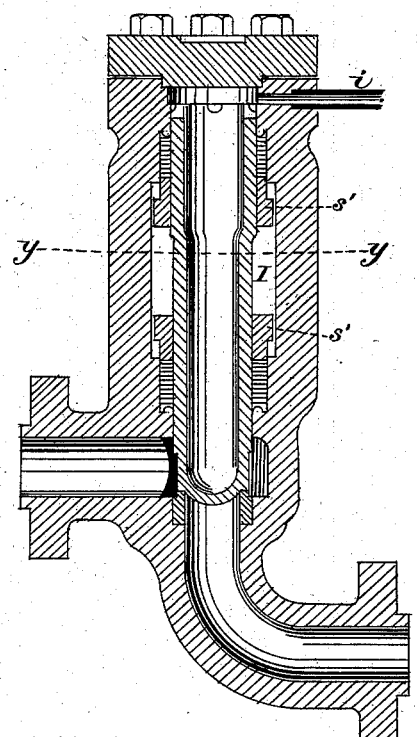
Figure 5:
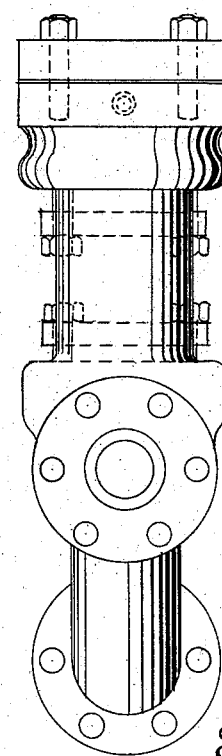
Figure 6:
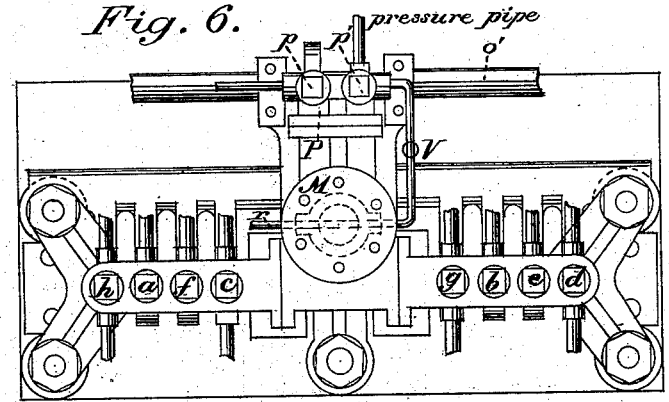
Figure 7:
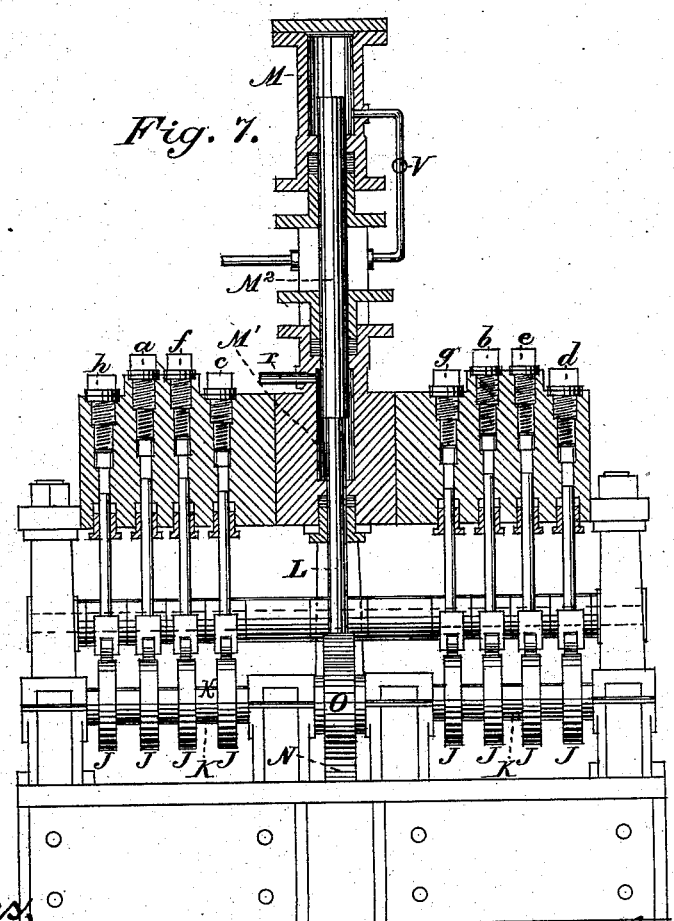
Figure 8:
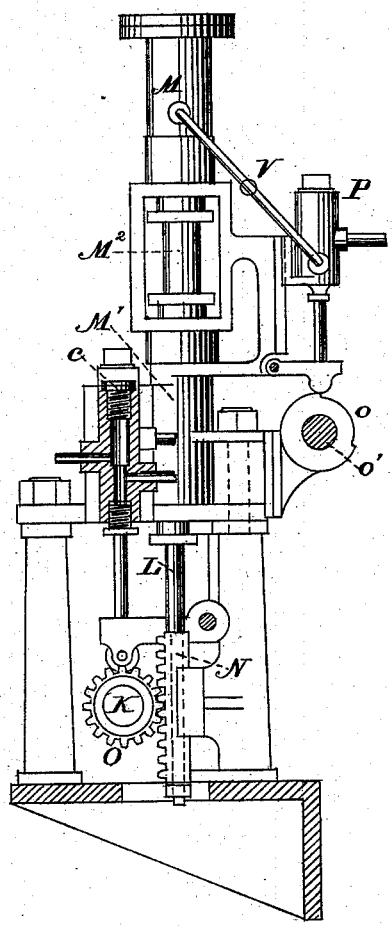
Figure 9:
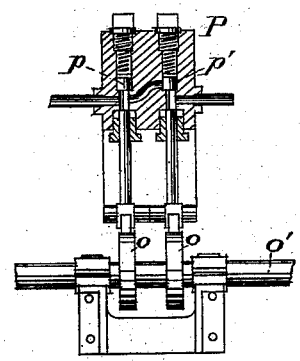
Figure 11:
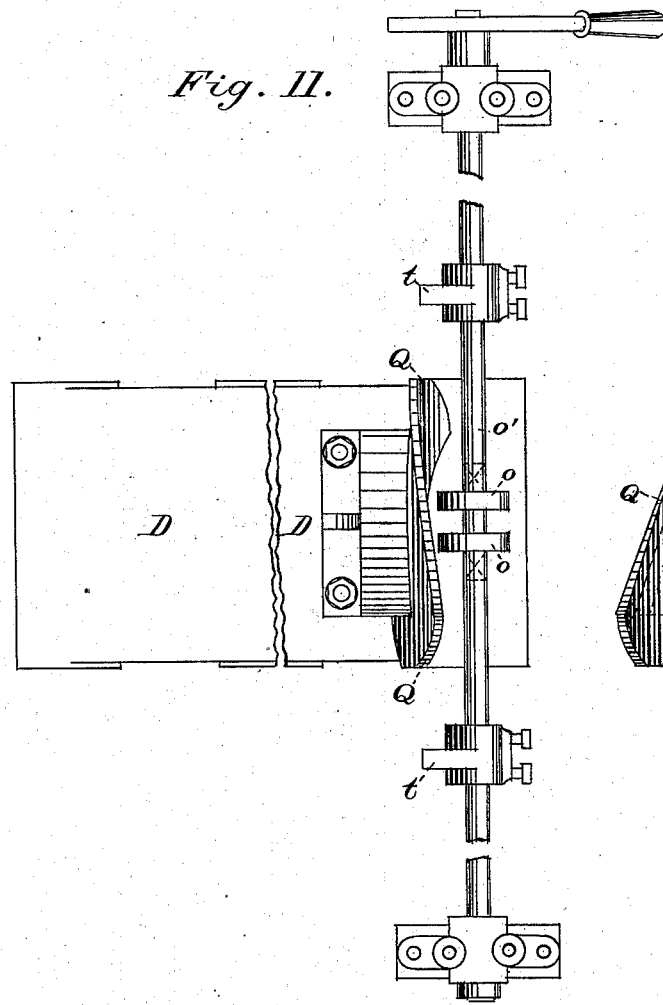
Figure 10:
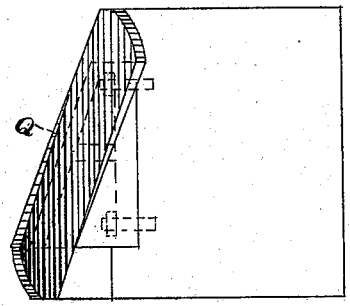
Figure 12:
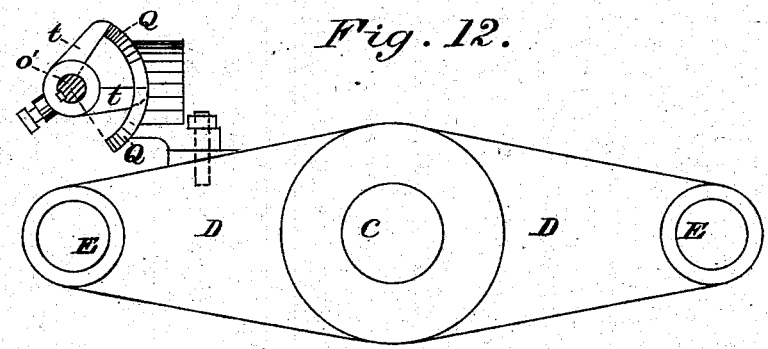
Figure 13:
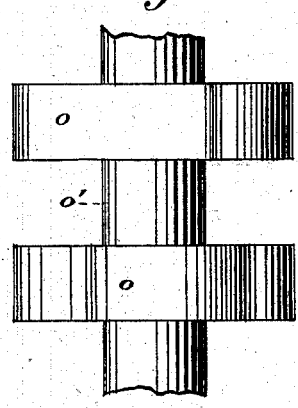
Figure 14:
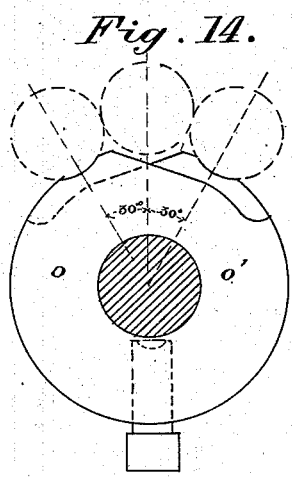

Referring to the accompanying drawings for a more complete explanation of my invention, Figure 1 is a plan of the pump and connecting-pipes, showing a longitudinal section of the pumps at one end. Fig. 2 is a transverse section of the cylinder and connection, taken through Fig. 1. Fig. 3 is a transverse section of a main valve and chamber. Fig. 4 is a vertical section of one of the main valves with its chamber. Fig. 5 is an exterior view of same. Fig. 6, Sheet 3, is an enlarged plan view of the auxiliary valves, shown at the right and center of Fig. 1, on a small scale. Fig. 7 is a sectional elevation of the auxiliary-valve chamber and valves and the time-cylinder. Fig. 8 is a view of the time-cylinder gearing and operating parts, and transverse section through one of the auxiliary valves. Fig. 9 is a sectional elevation of valves operating the time-cylinder. Figs. 10, 11, 12 are views of the spiral plates upon the cross-head, with the cam-shaft and tappets, by which the valves of the time-cylinder are moved. Figs. 13 and 14 are views of the cams which move the valves of the time-cylinder.

A and B are the two pump-cylinders.

C and C' are the plungers, one of which extends into one cylinder and the other into the other cylinder.

D is the cross-head, to which the plungers may be secured, as shown, and E E are rams or plungers secured in the cross-head and working parallel with the main plungers and simultaneously with them. These rams E and E receive the pressure of a column of water equal to a head much greater than the height to which water is to be raised by the main plunger, and it may be derived from accumulators or from a natural head. By the movement of the rams E and E the plungers C and C' are caused to force a column of water to a height depending upon the pressure exerted upon the power-rams E E. This class of pumps is employed in deep mines, and may have a lift of six hundred feet, more or less, between stations. The pressure upon the valves is very great, and the object of my present invention is to actuate these valves, so as to prevent shock or concussion upon them and the various pipes and connections.

$a\ b\ c\ d\ e\ f\ g\ h$, Figs. 1, 6, and 7, are small auxiliary valves, working in suitable chambers, and controlling the supply of water from the pressure-pipe G to the pipes which lead to the main valves I I' I$^2$ I$^4$. These auxiliary valves are operated by cams J, Fig. 7, fixed upon a shaft, K, which is caused to rotate alternately in one direction and the other by the movement of a piston-rod, L, which is driven by a ram within the cylinders M M'. A toothed rack, N, is fixed to the outer end of this piston-rod, and its teeth engage those of a spur-pinion, O, which is secured to the shaft K. The cylinders M M' have their axes in line, so that the plunger M$^2$ may extend into both cylinders. Within the cylinder M the whole area of the end of the plunger is exposed to the pressure of the water; but within the cylinder M' there is only the difference between the area of the plunger and the area of the piston-rod L. The water-pressure is admitted into the cylinder M' through a pipe, $r$, and remains constant. When there is no pressure within the cylinder M, that within the cylinder M' will be sufficient to move the plunger from M' into M; but when the pressure is admitted into the cylinder M, the greater area of the plunger within that cylinder causes it to be forced back into the cylinder M' and against the pressure within that cylinder.

Within the valve-chamber P are two valves, one, $p$, an inlet-valve, and $p'$ an outlet-valve. When the valve $p$ is opened, the pressure is admitted to the cylinder M. When this is closed and the valve $p'$ is opened, the water is allowed to escape and the pressure within the cylinder M' will act to return the plunger, as before stated. A cock or valve, V, in the pipe leading from the valve-chamber to the cylinder, controls the pressure, and consequently the rate of speed of the plunger. The stems of the valves $p$ $p'$ are moved by cams $o$ $o$, fixed upon a shaft, $o'$. This shaft has arms $t$ keyed to it in such relative positions that they will be struck by the plate Q (shown in Figs. 1, 11, and 12) at each end of the stroke, and the shaft and cams rotated a short distance in each direction alternately, and the valves of the time-cylinder will be thus moved. The plate Q is of a curved or spiral shape, as shown, and is secured to the cross-head D, so as to reciprocate with it. The cylinder M is termed the "time-cylinder," and the cams J are so placed relative to each other that they will be opened in the following order: First, to close the supply-valve from the moving side of the piston; second, to close the exhaust-valve from the opposite end; third, to open the exhaust-valve for the return-stroke; and, fourth, the inlet-valve for the return-stroke. These main valves are formed, as shown at I, Fig. 4, so as to move within chambers at each end, the middle portion being open, as shown, and the valves moving through stuffing-boxes $s'$. The upper ends of the valves are of larger diameter than their lower ends, so that when pressure is admitted from above it will close the valve by reason of the greater area of the upper ends. When the pressure is removed from above that from below will open the valve. The action of the time-cylinder M upon the auxiliary valves, through the cams J, will thus be as follows: The valve $a$ is first opened and the pressure of a column of water from the pressure-pipe is admitted through the pipe $i$ to close the supply-valve I from the moving side. As the rotation of the shaft K continues, the valve $b$ will be opened by its cam, and the water passing through the pipe $i'$ will close the exhaust-valve $I^2$ at the opposite end. The valve $c$ will then be opened by its cam, and the pressure exhausted from the top through the pipe $i^3$ to allow the exhaust-valve $I^4$ to open for the return-stroke; and, finally, the auxiliary valve $d$ will be opened and pressure exhausted through the pipe $i^4$, so as to allow the inlet-valve I' to open for the return-stroke. At the end of this stroke the reversal of the valves for the return-stroke is effected by the successive movement of the valves $e$, $f$, $g$, and $h$ in the same manner as has been described for the valves $a$, $b$, $c$, and $d$, the main inlet-valve I' being first closed by the pressure admitted by valve $e$. Then the main exhaust-valve $I^4$ is closed by the action of valve $f$, after which the main exhaust-valve $I^2$, at the opposite end, will be opened by the action of valve $g$; and, finally, the main supply-valve I will again be opened by the action of the valve $h$. These main valves, as before described, are opened by relieving them from the pressure at the top, while that at the bottom remains constant, and they are closed by again admitting the pressure at the top, because with a pressure from the same head upon both sides, the greater area of the top causes them to be closed. The auxilliary valves, which may be of any suitable form, supply and cut off this pressure alternately by means of the small pipes $i$ $i'$ $i^3$ $i^4$. The water from the heavy pressure or operating pipe G passes through the small pipes to the auxiliary valves $a$ $b$ $c$ $d$ $e$ $f$ $g$ $h$, and as these valves are opened alternately in sets by the properly-timed cams J, which are rotated by means of the shaft K, actuated as described, the pressure from the main pipe G on the impulse in one direction, is transferred through two valves and pipes, $i'$ $i^4$, to open the main valves, I' $I^2$, to connect one set of the rams with the pressure-pipe, and at the same time two auxiliary valves cut off from the pressure-pipe and open to exhaust-pipes $i$ $i^3$, whereby valves I $I^4$ lift to exhaust the water from the other set of rams. When the stroke is in the opposite direction, the other four auxililary valves act in precisely the opposite directions. The water to be pumped up is drawn into the cylinders A B and discharged through valves, as in any ordinary lift-pump.

Having thus described my invention, what I claim as new, and desire to secure by Letters Patent, is—

1. In a hydraulic pumping apparatus, the main valves I, I', $I^2$, and $I^4$, in combination with auxiliary valves $a$ $b$ $c$ $d$ $e$ $f$ $g$ $h$, substantially as and for the purpose herein described.

2. The time-cylinder M, with its valves, piston, and piston-rod, in combination with the rack N, pinion O, shaft K, and cams J, all constructed to operate as and for the purpose set forth.

3. The valves R, having their upper and lower ends, made of different diameters, in combination with the chamber $s$, having openings above and below to admit the pressure of a column of water, substantially as and for the purpose set forth.

In witness whereof I hereto set my hand.

GEORGE W. DICKIE.

Witnesses:
C. D. COLE,
J. H. BLOOD.